United States Patent [19]

Staendeke et al.

[11] Patent Number: 4,505,849
[45] Date of Patent: Mar. 19, 1985

[54] POLYOL PRE-MIXTURE FOR MAKING FLAME-RETARDANT POLY-URETHANE FOAM PLASTICS

[75] Inventors: Horst Staendeke, Lohmar; Franz-Josef Dany; Joachim Kandler, both of Erfstadt, all of Fed. Rep. of Germany

[73] Assignee: Hoechst Aktiengesellschaft, Fed. Rep. of Germany

[21] Appl. No.: 469,466

[22] Filed: Feb. 24, 1983

[30] Foreign Application Priority Data

Mar. 11, 1982 [DE] Fed. Rep. of Germany ....... 3208693

[51] Int. Cl.$^3$ ................................................ C09K 3/28
[52] U.S. Cl. .................... 252/609; 521/106; 521/165; 521/906
[58] Field of Search .............. 252/606, 609, 610; 521/165, 106, 902, 906

[56] References Cited

U.S. PATENT DOCUMENTS

| | | | |
|---|---|---|---|
| 3,423,343 | 1/1969 | Barnett | 521/106 |
| 3,423,344 | 1/1969 | Odinak et al. | 521/106 |
| 4,129,693 | 12/1978 | Cenker et al. | 521/106 |
| 4,202,779 | 5/1980 | Smith et al. | 252/609 |
| 4,260,514 | 4/1981 | Foucht | 252/609 |
| 4,381,351 | 4/1983 | Szabat | 521/107 |
| 4,385,131 | 5/1983 | Fracalossi et al. | 521/55 |

*Primary Examiner*—Stephen J. Lechert, Jr.
*Assistant Examiner*—Howard J. Locker
*Attorney, Agent, or Firm*—Connolly and Hutz

[57] ABSTRACT

The disclosure relates to a storable polyol pre-mixture for making flame-retardant polyurethane foam plastics consisting of a mixture of a polyester polyol or polyether polyol and an ammonium polyphosphate as a flame-retardant agent. The pre-mixture contains more particularly an ammonium polyphosphate which corresponds to the general formula (I)

$$H_{(n-m)+2}(NH_4)_m P_n O_{3n+1} \qquad (I)$$

in which n stands for an integral average value of 100 to 1000, m stands for a whole number of up to n+2 and m/n stands for a value of about 1, has an acid number of 0.01 to about 5 mg KOH/g, contains 0.01 to 0.5 mass % water and 0.5 to about 15 mass % water-soluble fractions in water at 25° C.

3 Claims, No Drawings

POLYOL PRE-MIXTURE FOR MAKING FLAME-RETARDANT POLY-URETHANE FOAM PLASTICS

This invention relates to a storable polyol premixture for making flame-retardant polyurethane foam plastics, consisting either of a mixture of a polyester polyol and an ammonium polyphosphate having specific properties or of a mixture of a polyether polyol, foam stabilizer, amine catalyst, expanding agent and the ammonium polyphosphate as flame-retardant agent.

It has already been described that flame-retardant properties can be conferred upon polyurethane materials by incorporating unreactive compounds containing phosphorus and nitrogen into a polyol/polyisocyanate reaction mixture.

German Patent Specification DE-AS No. 12 83 532, for example, describes a process for making moulded flame-retardant polyurethanes from high molecular weight polyhydroxyl compounds, polyisocyanates, catalysts and ammonium phosphate as a flame-retardant agent and optionally expanding agents and surfactants, wherein the flame-retardant agent is an ammonium polyphosphate of the general formula $$H_{(n-m)+2}(NH_4)_m P_n O_{3n+1}$$

in which n stands for a whole number with an average value of more than 10, m stands for a whole number of up to n+2, m/n stands for a value between 0.7 and 1.1, the flame-retardant agent being used in a proportion of 5 to 15 mass %, based on the batch.

A preferred feature of this prior process provides for a polyhydroxyl compound/ammonium polyphosphate-mixture to be prepared and for it to be admixed with all other components necessary for making the polyurethane foam. In this case, the ammonium polyphosphate is preferably used in proportions of about 5 to 15 mass %, based on the mixture.

A further preferred feature of the process described in German Patent Specification DE-AS No. 12 83 532 provides for the ammonium polyphosphate to be mixed with one or more of the feed materials needed for making the foam plastics, with the exception of the polyisocyanate compound, and for the polycondensation reaction to be initiated later if desired, by the addition of the polyisocyanate compound to the existing mixture.

The isocyanate-free mixtures made in accordance with the preferred features disclosed in German Patent Specification DE-AS No. 12 83 532 are generally termed polyol pre-mixtures. It is more particularly necessary for these pre-mixtures to be storable, i.e. the individual mixture components should not be liable to decompose or undergo undesirable side reaction during storage. Depending on the adhering water which is contained in ammonium polyphosphate and originates from its preparation and handling, the ammonium polyphosphate is liable during prolonged storage of the polyol pre-mixture to become partially split by hydrolysis, the split fragments producing an acid reaction and becoming deprived of their initial water-insolubility. As a result, the quantity of polyphosphate initially incorporated with the polyol pre-mixture fails to produce the flame-retardant effect awaited for the final polyurethane foam plastics.

We have now found that the adverse effects which are normally associated with the incorporation of prior ammonium polyphosphates into a polyol pre-mixture can be avoided by introducing a practically anhydrous ammonium polyphosphate with a low acid number into the polyol pre-mixture.

The present invention relates more particularly to a storable polyol pre-mixture for making flame-retardant polyurethane foam plastics consisting essentially of (a) a mixture of a polyester polyol or polyether polyol and an ammonium polyphosphate as a flame-retardant agent or (b) of a mixture of a polyether polyol, an ammonium polyphosphate as a flame-retardant agent, and at least one component selected from a foam stabilizer, amine catalyst and expanding agent, the pre-mixture containing an ammonium polyphosphate corresponding to the general formula (I)

$$H_{(n-m)+2}(NH_4)_m P_n O_{3n+1} \quad (I)$$

in which n stands for an integral average value of 100 to 1000, m stands for a whole number of up to n+2 and m/n stands for a value of about 1, having an acid number of 0.01 to about 5 mg KOH/g, containing 0.01 to 0.5 mass % water and 0.5 to about 15 mass % water-soluble fractions in water at 25° C.

The ammonium polyphosphate should preferably present the following particle size distribution in %:

| | |
|---|---|
| <400 μm | >99.5% |
| <150 μm | >99.5% |
| <75 μm  | 99.5%  |
| <45 μm  | 98.0%  |
| <25 μm  | 92.0%  |

A further preferred feature of the invention provides for the ammonium polyphosphate to have an acid number of 0.1 to 2 mg KOH/g, to contain 0.01 to 0.2 mass % water, and 3 to 10 mass % water-soluble fractions in water at 25° C.

It is finally preferable for the polyol pre-mixture to contain long-chain ammonium polyphosphate, to consist essentially of crystalline modification II and to have been made by reacting a mixture of phosphorus pentoxide and ammonium orthophosphate in a molar ratio of 1:0.9 to 1:1.1 with 0.1 to 15 mol% melamine or one of its condensation products selected from melam, melem or melon, calculated as melamine and based on the phosphorus pentoxide used, at a temperature of 50° to 150° C. in the presence of an excess of ammonia, and tempering the resulting reaction product at temperatures between 200° und 400° C.

A product of this kind is commercially available under the designation EXOLIT 422 (this is a registered Trade Mark of Hoechst Aktiengesellschaft, Frankfurt-/Main) which has the following typical physical properties:

Screen analysis:

| Particle size | <400 μm | >99.5% |
|---|---|---|
| | <150 μm | >99.5% |
| | <75 μm  | 99.5%  |
| | <45 μm  | 98.0%  |
| | <25 μm  | 92.0%  |

H₂O-content: 0.09 mass %.
pH-value of 1 wgt % suspension: 6.1.
Acid number: 0.5 mg KOH/g.

Viscosity of 10 wgt % aqueous suspension at 25° C.: 90 mPa.s.

Dissolved constituents of a suspension of 10 g EXOLIT 422 is 100 ml water at 25° C. after 1 hour: 7.5 mass %.

The polyol pre-mixture of this invention compares favorably with comparable prior art mixtures as regards initial viscosity which is insignificantly increased only even during prolonged storage so that it remains always serviceable for making polyurethane foam plastics. This is a result of the specific beneficial properties of the ammonium polyphosphate contained in the pre-mixture.

The following Examples illustrate the invention and describe the advantageous properties of the present polyol pre-mixture.

EXAMPLE 1

The ammonium polyphosphate of this invention in the form of EXOLIT 422 (product A) and the commercially available comparable product PHOS CHECK P/30 (this is a registered Trade Mark of Monsanto, USA; product B) were tested for their acid numbers, depending on storage period at 50° C. Product B was found to have the following physical properties:

Screen analysis:

| Particle size | | |
|---|---|---|
| < 400 μm | 99.5% |
| < 150 μm | 99.0% |
| < 75 μm | 98.0% |
| < 45 μm | 91.0% |
| < 25 μm | 49.0% |

$H_2O$-content: 0.75 mass %.
pH-value; 6.3.
Acid number: 5.6 mg KOH/g.
Dissolved constituents of a suspension of 10 g of product B in 100 ml water at 25° C. after 1 hour: 16 mass %.
Viscosity of 10 wgt % aqueous suspension at 25° C.: 31 mPa.s.

The results obtained are indicated in the following Table 1.

TABLE 1

| Storage period at 50° C., in hours | Acid number mg KOH/g | |
|---|---|---|
| | product A | product B |
| 0 | 0.5 | 5.6 |
| 72 | 0.7 | 6.4 |
| 168 | 1.0 | 9.5 |
| 336 | 1.2 | 11.7 |

EXAMPLE 2

Various polyol pre-mixtures consisting of a polyester polyol in the form of DESMOPHEN 2200 (this is a registered Trade Mark of Bayer Aktiengesellschaft, Leverkusen) and product A and product B, respectively, were tested for their viscosity at 25° C., the viscosity of the polyester polyol at 25° C. being 20.9 Pa.s.

The results obtained are indicated in the following Table 2.

TABLE 2

| Concentration of product A and product B, respectively, in polyol (g/100 g suspension) | Viscosity at 25° C. (Pa · s) | |
|---|---|---|
| | Mixture of polyol and product A | Mixture of polyol and product B |
| 10 | 23.2 | 24.4 |
| 20 | 29.2 | 34.0 |
| 30 | 40.8 | 55.2 |
| 40 | 84.0 | 132.0 |

EXAMPLE 3

The procedure was as in Example 2, but a polyether polyol CARADOL 585-8 (this is a registered Trade Mark of Shell Chemie, Frankfurt) was substituted for the polyester polyol. The polyester polyol had a viscosity of 5.1 Pa.s at 25° C. The results obtained are indicated in the following Table 3.

TABLE 3

| Concentration of product A and product B, respectively, in polyol (g/100 g suspension) | Viscosity at 25° C. (Pa · s) | |
|---|---|---|
| | Mixture of polyol and product A | Mixture of polyol and product B |
| 10 | 5.8 | 6.3 |
| 20 | 7.5 | 8.4 |
| 30 | 10.4 | 14.6 |
| 40 | 18.7 | 33.0 |

The polyols in Example 2 and 3, respectively, had the following typical properties:

Polyol used in Example 2: DESMOPHEN 2200 is a branched polyester based on adipic acid, diethylene glycol and triol. The product is a slightly yellowish liquid which is highly viscous at room temperature and has the following typical properties:
Density (at 20° C.): about 1.18 g/ml.
Refractive index (at 20° C.): 1.4774±0.0003.
Solidifying point: −13° C.
Flash point: 215° C.
Hydroxyl number: 60±3 mg KOH/g.
Acid number: <1 mg KOH/g.
Water content: <0.1 mass %.

Polyol used in Example 3: CARADOL 585-8 is a polyether polyol of mean functionality. The product is a pale yellow medium viscous liquid which has the following typical properties:
Density (at 20° C.): 1.101 g/ml.
Flash point: 200° C.
Hydroxyl number: 580 mg KOH/g.
Acid number: 0.1 mg KOH/g.
Water content: 0.1 mass %.

We claim:

1. Storable polyol pre-mixture for making flame-retardant polyurethane foam plastics consisting essentially of ammonium polyphosphate, a mixture of polyols selected from the group of polyesterpolyols or polyetherpolyols, foam stabilizer, amine catalyst and expanding agent, wherein the ammonium polyphosphate has the general formula

$$H_{(n-m)+2}(NH_4)_m P_n O_{3n+1}$$

in which n stands for an average value of 100 to 1,000, m stands for a whole number of up to n+2 and m/n stands for a value of about 1, having an acid number of 0.01 to 5 mg KOH/g, containing 0.01 to 0.5 weight percent water and 0.5 to 15 weight percent water-soluble fractions in water at 25° C.

2. Polyol pre-mixture as claimed in claim 1, wherein the ammonium polyphosphate has an acid number of 0.1 to 2 mg KOH/g, contains 0.01 to 0.02 mass % water, and 3 to 10 mass % water-soluble fractions in water at 25° C.

3. Polyol pre-mixture as claimed in claim 1, wherein the ammonium polyphosphate has a long chain, consists essentially of crystalline modification II and has been made by reacting a mixture of phosphorus pentoxide and ammonium orthophosphate in a molar ratio of 1:0.9 to 1:1.1 with 0.1 to 15 mol % melamine or one of its condensation products selected from melam, melem or melon, calculated as melamine and based on the phosphorus pentoxide used, at a temperature of 50° to 150° C. in the presence of an excess of ammonia, and tempering the resulting reaction product at temperatures between 200° and 400° C.

* * * * *